INVENTOR
EDWARD Y. H. KENG

United States Patent Office 3,453,881
Patented July 8, 1969

3,453,881
METHOD AND APPARATUS FOR VOLUME MEASUREMENT
Edward Y. H. Keng, Smyrna, Ga., assignor to Georgia Tech Research Institute, Atlanta, Ga., a corporation of Georgia
Filed Dec. 19, 1966, Ser. No. 603,034
Int. Cl. G01f *17/00*
U.S. Cl. 73—149          11 Claims

ABSTRACT OF THE DISCLOSURE

Method and apparatus for precisely determining volume of gases, irregular bodies and powered materials comprising a variable volume hermetically sealable system with a reference compartment within which the irregular material is placed, means for establishing a predetermined gas pressure within said reference compartment when said compartment contains irregular materials, and when said compartment is empty, and a pressure detection mechanism within said system to register the attainment of the predetermined pressure within the reference compartment.

---

This invention relates to a method of and apparatus for precisely determining volumes of gases, irregular bodies and powdered materials. More particularly, the present invention relates to a method of and apparatus for determining either the volume of an irregular sample by means of precise and accurate measurements of an amount of gas required to establish a predetermined pressure within a compartment varied in displacement volume by the placement of the sample therein or the volume of gas adsorbed by a sample by means of first precisely and accurately measuring the displacement volume of the sample as described above using a gas which is not adsorbed by the sample and then determining the displacement volume of the sample as described above using a gas which is adsorbed by the sample. The difference between these last two figures would represent the volume of gas adsorbed by the sample.

The type of apparatus employed here operates on the fluid mechanics principle that an increase or decrease in the volume of a container will cause a correspondingly inverse decrease or increase in the pressure of the gas within that container, assuming that the temperature of the entire system remains constant. This principle is commonly known as Boyle's law and is represented mathematically by the following formula: $PV=P'V'$ where P and V represent the initial pressure of the gas and volume of the container and P' and V' represent the final pressure of the gas and final volume of the container after a change in either the pressure or volume.

In the past, efforts have been made to use the above mentioned law to determine the volume of irregular materials. One such effort employed a pair of equally variable volume containers joined together by a valving system and having a differential pressure gauge communicating with both. By placing a sample within one and varying the volume of both containers while maintaining an equal pressure in both, one could determine the displacement volume of the sample. However, only a conventional pressure detection mechanism was employed giving thereby only nominally accurate determinations of pressure within the two containers. Moreover, since two containers were used any error that occurred would be in effect multiplied by a factor of two thus doubling the inaccuracy of the entire system.

A first feature of the present invention resides in the provision of a new, unique and highly accurate method and means for determining the precise pressure within a system while employing only one reference compartment. Thus, the apparatus is capable of determining volumes to the third decimal point and possibly smaller and reducing the error multiplication factor to a figure approaching 1.

Another feature of the invention resides in the provision of an apparatus which is of relatively simple construction, easy to operate, and is extremely accurate in operation.

A further feature of the invention resides in the use of a pressure responsive bellows as a primary element of the pressure detection mechanism and the use of a suitable electric circuit connected to an incandescent lamp as a secondary element of the pressure detection mechanism.

A further feature of the invention resides in the fact that the system and method may be used not only to determine the precise volume of irregular materials, but also the precise volume of gas adsorbed by materials.

Another feature of the invention resides in the use of a method and means by which the volume of the system may be measurably increased or decreased.

Other objects, features and advantages of the present invention will become apparent from the following description, taken in conjunction with the accompanying drawings, in which.

Apparatus

Figures 1, 2:
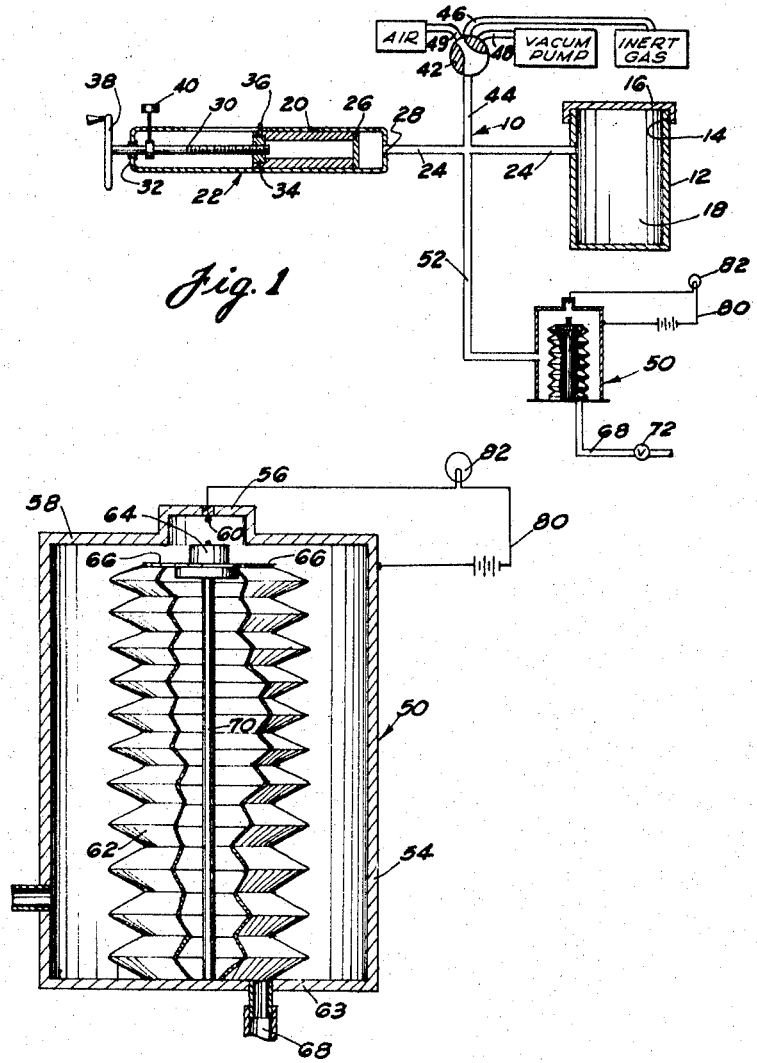
FIG. 1 is a schematic view which will be used to explain the principle upon which the method and apparatus of the present invention are based.
FIG. 2 is a cross-section of the housing of the pressure detection mechanism showing the bellows partially broken away.

Generally, the apparatus of the present invention comprises a reference compartment of standard volume, means for measurably increasing or decreasing the volume of the compartment by increasing the volume of the related system, and means for accurately and precisely determining the pressure of the gas within the compartment and system. The present invention is practiced by first determining the volume of the entire system required to attain a predetermined pressure within the unoccupied compartment and system, then determining the volume of the system required to attain that same predetermined pressure within the system while it is occupied by the irregular material, and then subtracting the figure representing the volume of the system when occupied from the figure representing the volume of the system when unoccupied. The result represents the volume of the irregular material which occupied the compartment.

Rather than describe a particular embodiment of the invention, a detailed description of the pressure detection mechanism and a schematic embodiment of the entire system will be given. Thus, referring to FIGS. 1 and 2, the system 10 generally includes a sample cup 12 which has a threaded annular lip 14. Hermetically sealing cup 12 has a removable lid 16 threadedly received by lip 14. When lid 16 is properly positioned upon lip 14 of cup 12, there is created a reference compartment 18 of invariable volume. Apparatus 10 further includes a pump 20 interconnected by means of conduit 24 with reference compartment 18, three-way valve 42 and pressure detection mechanism 50. Valve 42 and mechanism 50 comprise integral and essential elements of this invention and will be discussed in greater detail in a later portion of this description. Pump 20 comprises an elongate cylinder 22 fitted with a piston 26 which is hermetically slidable therein. One end of cylinder 22 defines an orifice 28 to which conduit 24 is attached. Through the opposite end of cylinder 22 passes means for advancing and retracting piston 26. Such means may include a precision lead screw 30 which is journalled for rotation in end plate 32. A nut 34 is attached to piston 26 and engages the thread of lead screw 30 to advance and retract the piston as the lead screw is rotated. The piston 26 is prevented from rotating by pin 36 which is disposed in a slot in the cylinder wall. Thus, it will be seen that as hand wheel 38 is rotated, the piston is advanced and retracted.

Means are further provided for indicating the relative position of piston 26 within cylinder 22 so as to thereby indicate the volume in cylinder 22 swept by the piston 26. Such means may include a revolution counter 40 geared to screw 30 to indicate each complete revolution or portion thereof. Preferably, this counter should be capable of determining one thousandth of a revolution of screw 30. Thus, when handwheel 38 is rotated, piston 26 is translated inwardly and outwardly, decreasing or increasing the total volume of the system 10 thus increasing or decreasing the total pressure of the gas within system 10. The revolution counter reading would increase with increasing volume and correspondingly decrease with decreasing volume.

Emptying into conduit 24 intermediate of reference compartment 18 and pump 20 is tubing 44 through which flows a volume of gas introduced into the system by three-way valve 42. Valve 42 has one of its three injection nozzles 46 connected to a source of inert gas such as helium under a determinable pressure, another nozzle 48 connected to a vacuum pump for evacuating the entire system, and a third nozzle 49 either open to atmospheric pressure or connected to a source of air under a determinable pressure. Thus, the initial pressures and gases with which the system will function may be conveniently and effectively altered.

Also emptying into conduit 24 is piping 52, joining pressure detection mechanism 50 with the system 10. The pressure detection mechanism 50 comprises a housing 54 having an outwardly extending vertical depression 56 formed in the top wall 58. Extending through and insulated from the uppermost portion of depression 56 is an electrical contact 60 terminating in length intermediate the depth of depression 56. Contact 60 is resiliently positioned so that it may be moved vertically with respect to depression 56. Disposed within housing 54 is a bellows 62 constructed of an electrically conductive suitably impermeable foldable and wear-resistant material which has the ability to accurately withstand numerous increases and decreases in length. Bellows 62 is hermetically sealed to the base 63 of housing 54. Thus, increases or decreases in pressure within the bellows 62 or housing 54 will cause an expansion or contraction of the bellows 62 in an effort to rectify the differentials in pressure within and without the bellows. Due to the impermeability of the bellows, rectification may be only accomplished through increases or decreases in the volume of the bellows. The upper portion of bellows 62 is formed into a centrally located outwardly projecting vertical neck 64 complementary with and adjacent to depression 56 of housing 54. The vertical height of neck 64 is such that upon expansion of bellows 62, neck 64 will nest within depression 56 until electrical union is established with contact 60, which resiliently retracts thereby preventing unnecessary damage to the contact point; contact 60, however, remains biased against neck 64 during this period, thus maintaining the electrical union. Shoulders 66 of bellows 62 will rest against the interior surface of top wall 58 at the approximate moment of union and will prevent excessive entrance of neck 64 into depression 56. Thus, damage to the electrical contact 60 is obviated.

Within bellows 62, there is a vertical support 70, designed to prevent unnecessary collapsing and crushing of bellows 62. Furthermore, support 70 maintains bellows 62 in a partially expanded position so that the upper portion of neck 64 is only slightly removed from electrical union with contact 60. In this position, the bellows expands only after the pressure within housing 54 drops below the pressure within bellows 62 and contracts only slightly after the pressure within housing 54 exceeds the pressure within bellows 62. Furthermore, the bellows 62 records only that critical moment at which the pressure within bellows 62 exceeds the pressure within housing 54, since the shoulders 66 rest against wall 58 thereafter and prevent further entrance of neck 64.

System 10 may be operated by either increasing or decreasing the pressure within the entire system. If one chooses to increase the pressure within the system 10, piping 52 must communicate with the interior of bellows 62 so that increases in pressure within system 10 will cause an expansion of bellows 62 and entrance of neck 64 into depression 56. A hose 68 would then communicate with the interior of housing 54. Through hose 68 a gas at definite pressure above atmospheric pressure would be introduced into the housing 54 until there was established a definite reference pressure therein. Hose 68 would then be sealingly closed by means of valve 72. If one chooses to decrease the pressure within the system 10, piping 52 must communicate with the interior of housing 54 so that decreases in pressure within system 10 will cause an expansion of bellows 62 and entrance of neck 64 into depression 56. Hose 68 would then communicate with the interior of bellows 62. Through hose 68 gas may be removed from bellows 62 until there is established a definite reference pressure therein. Hose 68 would then be sealingly closed by means of valve 72. In this position, no matter what procedure is to be followed, bellows 62 would be collapsed upon support 70 but would be only slightly removed from electrical union with contact 60.

A suitable electric circuit 80 would then be connected between contact 60 and housing 54 so that upon electrical union between contact 60 and neck 64 current may flow from contact 60 through bellows 62 and base 63 to housing 54 and then through circuit 80 back to contact 60. Disposed in circuit 80 is an incandescent lamp 82 which will emit light upon the union of contact 60 and neck 64 completing the electrical circuit 80. Of course, for an electrical circuit to be completed, housing 54, neck 64 and shoulders 66 must be constructed from a suitable electrically conductive material.

After considerable use, it has become apparent that the present invention functions best if the system pressure is decreased to a predetermined pressure below atmospheric pressure. It has further become evident that reference pressures between 400 and 500 millimeters of mercury give an operation and result which is highly accurate and precise.

The predetermined pressure is that pressure within the system which will cause neck 64 to enter into electrical union with contact 60. Thus, this predetermined pressure is just slightly above or below the reference pressure of the pressure detection mechanism 50, depending on whether one chose to decrease or increase the pressure within compartment 18 and correspondingly system 10.

While a pressure responsive bellows has been disclosed as the most effective pressure detection mechanism, it should be understood that other type precise pressure detection mechanisms are equally within the scope of this invention. Other pressure detection mechanisms contemplated include an extremely accurate pressure indicator and a graduated manometer.

If the sample is activated so that under pressure it adsorbs air and under a partial vacuum it desorbs air, the sampling gas must be inert. Helium has been found to be quite acceptable in that it is scientifically assumed that no adsorption occurs with its use. Therefore, if there is ever a question as to whether air may be adsorbed by the sample, it would be best to use helium as the gas.

If there is no possibility of adsorption, one can safely and accurately use air and expect quite satisfactory results. However, if air is used, it is strongly recommended that only decreases in pressure be used, since upon compression the moisture in the air is prone to form a condensate which would be detrimental to the system and, of course, destructive to the accurateness and preciseness of the test. Helium, on the other hand, will not condense under either compression or evacuation. Therefore, for another reason, helium is again recommended as the best sampling gas.

*Method for determining volume*

Initially, we will assume an ideal condition in which the system is in perfect calibration, atmospheric pressure remains constant throughout the series of tests, and the gas of the system before and after evacuation is allowed to reach system temperature. First, a pressure of between 400 and 500 millimeters of mercury, preferably 450 millimeters of mercury, known hereinafter as the reference pressure, is established within the bellows 62 of pressure detection mechanism 50. Then, if lid 16 is threadedly driven onto cup 12 until reference compartment 18 is hermetically established, and valve 42 is open so as to equalize the pressure of the system with atmospheric pressure, and then closed, it will be evident that the system is closed at atmospheric pressure. Hand wheel 38 is now rotated to retract piston 26, thus increasing the volume and lowering the pressure of the system according to the following formula: $P_1 V_s = P_2 V_2$ where $P_1 V_s$ equals the initial pressure (atmospheric) times the initial volume of the system and $P_2 V_2$ equals the final pressure times the final volume of the system where either the pressure or the volume is varied. If we always retract piston 26 until the pressure in the system is lowered to the point that neck 64 of bellows 62 is just expanded into electrical union with contact 60 within depression 56, the final pressure will equal the reference pressure initially created within bellows 62 plus a pressure differential sufficient to cause the neck 64 to enter into depression 56 and union with contact 60. The pressure differential will be constant throughout the operation of the device and thus, does not influence the results obtained. The pressure initially created within bellows 62 and the pressure differential required to cause neck 64 to enter depression 56 are known collectively hereinafter as the predetermined pressure. Therefore, letting $\Delta V_s$ represent the change in volume required to establish the same final pressure, $P_2$, when an irregular material X having volume $V_x$ is added to the system $V_s$, the above formula may be expressed as:

$$P_1 V_x = P_2 (V_x + \Delta V_s)$$

or $$P_1 V_x = P_2 V_x + P_2 \Delta V_s$$

or $$P_1 V_x - P_2 V_x = P_2 \Delta V_s$$

or $$V_x \frac{P_1 - P_2}{P_2} = \Delta V_s$$

or, finally, $$V_x = \Delta V_s \frac{P_2}{P_1 - P_2}$$

Consequently, it becomes apparent that the volume $V_x$ equals the change in volume, $\Delta V_s$, required to attain the predetermined pressure, $P_2$, times a factor representing a proportion of final predetermined pressure to the difference between the initial pressure (atmospheric) and the final predetermined pressure.

Further, allowing $R_0$ to equal the reading of the counter 40 at the predetermined pressure without material X in compartment 18; $R_x$ to equal the reading of the counter 40 at the same predetermined pressure with material X in compartment 18; and $\alpha$ to equal the dial reading difference per cubic centimeter change in volume of the system, there may be expressed the following formula:

$$\alpha = \frac{R_x - R_0}{\Delta V_s} \text{ or } \alpha \Delta V_s = R_x - R_0 \text{ or } \Delta V_s = \frac{R_x - R_0}{\alpha}$$

Preferably, $\alpha$ should equal a factor so that one revolution of hand wheel 38 equals one cubic centimeter change in the volume of the system.

Then, substituting this result in the previously mentioned formula, there results:

$$V_x = \frac{R_x - R_0}{\alpha} \cdot \frac{P_2}{P_1 - P_2}$$

or by allowing $\Delta P$ to equal $P_1 - P_2$ and $\Delta R$ to equal $R_x - R_0$;

$$V_x = \frac{\Delta R}{\alpha} \cdot \frac{P_2}{\Delta P} \text{ or } V_x = \frac{P_2}{\alpha \Delta P} \cdot \Delta R$$

It should be understood at this point that $\alpha$ is a mechanical correction factor which depends on the piston size, lead screw threads, and the gear ratio of the counter. For each system, $\alpha$ is a fixed quantity which does not vary with changes in temperature, pressure, and volume of the system.

Therefore, from the last formula, it may be seen that the volume of material X equals the change in the counter reading times a factor representing a proportion of final predetermined pressure to the multiplicand of difference between the initial pressure (atmospheric) and the final predetermined pressure times $\alpha$. For simplicity's sake, this entire factor may be represented by $\beta$ which would therefore equal:

$$\beta = \frac{P_2}{\alpha \Delta P} = \frac{P_2}{\alpha (P_1 - P_2)}$$

Then the volume of material X would equal: $V_x = \beta \Delta R$.

Rather than compute $\beta$ for each use of the system by accurately establishing atmospheric pressure and the predetermined pressure, I have found that it is best to establish $\beta$ by determining the system volume change, $\Delta V_s$, for an object K of known volume, $V_k$. Then the ratio of $V_k$ to $(R_k - R_0)$ would equal $\beta$, where $R_k$ is the reading of the counter 40 with the object of known volume, $V_k$, within compartment 18. Furthermore, it would be best to have $\beta$ approach one so that any error in the system would not be magnified by multiplication by a large $\beta$ factor. Thus, if after the comparison of $V_k$ and $(R_k - R_0)$, the $\beta$ factor is large, the predetermined pressure within the bellows may be reduced. Thus, by the following formula: $\beta = P_2 / \alpha \Delta P$, the $\beta$ factor is reduced by reducing the predetermined pressure, $P_2$, which also changes $\Delta P$. By approaching 1 as a value for $\beta$, the system would read a volume of the irregular material X as accurately as possible.

In practice, the foregoing information is utilized by first establishing a reference pressure of preferably 450 millimeters of mercury within bellows 62. Then, enclosing compartment 18 by threadedly securing lid 16 to cup 12 and setting counter 40 at a standard initial point, $R_1$, from which all measurements as to sweeps of piston 26 within cylinder 22 will begin. Then, permitting the entire system to move to equilibrium with atmospheric pressure by first opening valve 42 to atmospheric pressure, waiting a period of time approximating 15 to 30 seconds during which time the system may adjust, and closing valve 42. The first value for the system is now obtained by rotating hand wheel 38 thus retracting piston 26 until light 82 is illuminated. At that first illumination, a reading should be taken from counter 40 and recorded as $R_0$.

To establish a $\beta$ factor, the counter is then returned to the initial point $R_1$, valve 42 is opened to atmospheric pressure, and lid 16 is removed from cup 12. An object K of known volume, $V_k$, preferably known to the third decimal point, is then placed in cup 12. The above mentioned procedure is then followed until light 82 is illuminated. The counter reading at that first illumination is then recorded as $R_k$. The procedure employed in the retraction of the piston should be as nearly duplicated as possible. Then $\beta$ may be evaluated by the following formula:

$$\beta = \frac{V_k}{R_k - R_0}$$

If this factor is unduly large or unusable, it may be adjusted by adjusting the reference pressure within bellows 62 until the value representing the volume of the object as determined by the system more closely approaches the actual known volume of the object. Of course, once the reference pressure within the bellows is adjusted, the initial figure representing volume of the system at the predetermined pressure must be recalculated. Once $\beta$ is determined to be a figure which is usably close to 1, the operator may proceed in the precise and accurate determination of the volume of an irregular material since $\beta$ remains constant so long as the surrounding environment (pressure and temperature) remains constant.

The volume of the irregular material is determined in much the same fashion as the other volumes were determined. The counter 40 is first returned to its initial point $R_1$, valve 42 is opened to atmospheric pressure and lid 16 is removed from cup 12. If the known volume object is in the cup at this time, it must be removed. The sample of unknown volume is then placed in the cup 12 and the lid 16 is replaced. After allowing the system to come to equilibrium with atmospheric pressure, valve 42 is closed. Piston 26 is then retracted until light 82 is first illuminated. A reading should be taken from the counter 40 at that time and recorded as $R_x$. The volume of the sample may then be determined by the formula:

$$V_x = \beta \Delta R = \beta(R_x - R_0)$$

If $\beta$ equals unity, as would be preferred, and the mechanical correction factor is such that one revolution of the lead screw 30 gives a one cubic centimeter change in the system volume, and the counter 40 is adjusted to read zero when there is no sample in compartment 18, the volume of the sample may be read directly from the counter in cubic centimeters. Further, if the counter provides sufficient calibration, the volume may be accurately and precisely read to the third decimal point.

One factor, which may destroy the accurateness of this series of tests, is a significant change in atmospheric pressure during the series of determinations. To combat this factor, it is suggested that nozzle 49 be connected to a calibrated pressure pump which would supply air at a definite and accurate pressure. Thus, each time the system was moved to equilibrium with "atmospheric pressure" the pressure would be equal to the last equilibrium established. Therefore, each increase in volume required to reduce the pressure of the system to the predetermined pressure would begin at a uniformly equal initial pressure. If a calibrated pressure pump is not available, it is recommended that an independent reading of $R_0$ should be obtained for each sample and the value of $\beta$ should be checked occasionally. This procedure, if properly used, will produce a result accurate to the third decimal point. In general, the atmospheric pressure and room temperature will not change significantly to influence the accuracy of the invention.

Another factor which would destroy the effectiveness and accurateness of this system is the adsorption of the gas by the sample. When samples are to be tested which may possibly adsorb the quantity of the air within the system, it is recommended that valve 42 by opened to the vacuum nozzle 48 until the closed system is sufficiently evacuated of air, then valve 42 should be positioned so that helium flows through helium nozzle 46. The pressure of the helium within the system may be adjusted to a recognizable and determinable figure. From that point, the sample could be quickly introduced into the compartment 18 and the test proceed as before mentioned. By using helium, one may scientifically assume that no adsorption will occur.

It should be understood that my invention is not restricted to only an evacuation of the system to a determinable point but includes also the compression of the system until a predetermined pressure is attained. The apparatus required for this alternative method was disclosed previously. The formulas mentioned hereinbefore would also apply in a compression situation after only minor obvious adjustments to the values involved.

Further areas of use for the present invention include the precise and accurate determination of density or weight per unit volume of a sample. Thus, after weighing the sample by means of the balance and precisely determining the volume of that same sample, one may determine the density of the sample by the formula: $D = W/D$ where D equals density, W equals weight and V equals volume.

*Method for determining adsorption and desorption*

In determining the amount of a specific gas adsorbed or desorbed by a specific sample of material due to a pressure change at constant temperature, first determine the volume of the sample as previously described using helium as the initial sampling gas. The predetermined pressure should be larger than atmospheric pressure for adsorption measurement and less than atmospheric pressure for desorption measurement. The figure resulting from the test indicates the volume of that sample with no adsorption or desorption taking place. Next, evacuate the system and introduce the gas for which an adsorption or desorption factor is desired. Determine the "volume" of the sample using the method as previously described. This figure will represent the volume of the sample and the volume of that gas adsorbed or desorbed by the sample. Then, by subtracting the volume as determined with helium from the "volume" as determined with the adsorbed or desorbed gas, or vice versa, a result is given representing the volume of the adsorbed or desorbed by that sample while varying the pressure of the system from the initial pressure to the predetermined pressure. The amount of gas adsorbed or desorbed in moles thus can be calculated by the following formula: $n = PV/RT$, where P is the predetermined pressure, V is the difference in volumes which are determined by the use of helium and the adsorbed or desorbed gas, R is the gas constant and T is the operation temperature. Then the amount of gas adsorption or desorption due to a pressure change may be represented as moles of gas per unit volume of material or per unit mass of material.

It will be apparent that the particular embodiment of the invention shown and described herein is of illustrative character and that various modifications in construction and arrangement of parts and sequence of steps may be made.

Having thus described the invention, what is claimed and desired to be secured by Letters Patent is:

1. Apparatus for determining the precise volume of irregular materials comprising:
   (a) a variable volume hermetically sealable system having a reference compartment within which the irregular material is placed;
   (b) means for establishing a predetermined pressure of a gas within said reference compartment when said compartment is without a sample and when a sample is in said compartment;
   (c) a pressure detection mechanism interconnected with said system for recognizing the attainment of the predetermined pressure within the vacant and the sample occupied compartment; and
   (d) means for indicating the amount of volumetric increase and decrease due to the irregular materials in the system.

2. Apparatus for determining the precise volume of irregular materials as recited in claim 1 wherein the pressure detection mechanism comprises:
   (a) a housing communicating with the interior of said reference compartment through a side section of said housing, said housing further having top and base sections;

(b) a pressure responsive bellows disposed within said housing and impermeably sealed to said base section thereof; and, (c) means for detecting longitudinal movement of said bellows in response to changes in pressure within said compartment.

3. Apparatus for determining the precise volume of irregular materials as recited in claim 1 wherein the means for establishing a predetermined pressure within the compartment comprises:

(a) a hollow cylinder having first and second apertures in the opposite ends thereof;

(b) a hollow piston having a threaded aperture in one end slidably and hermetically received within said cylinder adjacent said first aperture;

(c) a lead screw having one end threadedly received within said threaded aperture for adjustments in the longitudinal position of said piston in said cylinder in response to rotations of said screw;

(d) means for rotating said lead screw remote from said piston; and, (e) a conduit communicating at one end with said cylinder through said first aperture and at the opposite end with the interior of said reference compartment; whereby increases or decreases in the volume of the cylinder between said piston and said first aperture causes a corresponding increase or decrease in the volume of the system.

4. Apparatus for determining the precise volume of irregular materials as recited in claim 3 wherein the means for determining the volume of gas displaced by the material comprises:

(a) a revolution counter geared to said lead screw for counting the revolutions of said screw as said screw is rotated to translate said piston inwardly and outwardly within said cylinder; and, said counter indicating the amount of volumetric increase and decrease within said cylinder for each rotation of said screw.

5. Apparatus for determining the precise volume of irregular materials as recited in claim 2 wherein said housing further comprises:

(a) a top section having an upwardly vertical depression formed therein through which passes an electrical contact terminating in length intermediate the depth of said depression;

and the elongated pressure responsive bellows further comprises:

(a) a top portion formed into a central upwardly vertical neck having lower shoulders created around its periphery, said neck being adjacent to and complementary with said depression formed in the top section of said housing and having a vertical height sufficient to create a union between said contact and said neck, said shoulders being adjacent said non-depressed top section and being of a width and arrangement sufficient to contact said non-depressed top section and terminate upward movement of said neck into said depression immediately after union between said neck and said contact; and, (b) a vertical support member disposed within said bellows, said member maintaining said bellows in a partially extended position with said neck only slightly removed from union with said contact;

and said means for detecting longitudinal movement of said bellows in response to changes in pressure within said system comprises:

(a) an electrical circuit running from said neck to said side section, and then exteriorly to said contact disposed through said depression;

(b) an incandescent lamp disposed in said electrical circuit for indicating union between said contact and said neck; and, (c) an electrical power supply for illuminating said lamp upon union between said contact and said neck.

6. Apparatus for determining the precise volume of irregular materials as recited in claim 5 wherein said gas is inert.

7. Apparatus for determining the precise volume of irregular materials as recited in claim 5 wherein said gas is air.

8. Apparatus for determining the precise volume of irregular materials as recited in claim 5 wherein said gas is helium.

9. A method for determining the precise volume of irregular materials including the following steps:

(a) measuring the change in volume of a closed volumetrically variable system required to change the pressure in the system from an initial pressure to a predetermined pressure different from the initial pressure;

(b) placing a material of unknown volume within the system;

(c) measuring the change in volume of the occupied volumetrically variable system required to produce the same predetermined pressure from the same initial pressure;

whereby the volume of the material may be determined in accordance with the formula:

$$V_x = \Delta V_s \frac{P_2}{P_1 - P_2}$$

wherein $V_x$ is the volume of the material; $P_1$ is the initial pressure of the system; $P_2$ is the predetermined pressure; and $\Delta V_s$ is the change in volume at the predetermined pressure caused by the insertion of the material into the system, $\Delta V_s$ being calculated by subtracting the figure representing change in volume of the occupied system to produce the predetermined pressure from the figure representing change in volume of the unoccupied system to produce the predetermined pressure.

10. A method for determining the precise volume of irregular materials as recited in claim 9 wherein the predetermined pressure is greater than atmospheric pressure, the initial pressure is atmospheric pressure and the predetermined pressure is established by decreasing the volume of the system.

11. A method for determining the precise volume of irregular materials as recited in claim 9 wherein the predetermined pressure is less than atmospheric pressure, the initial pressure is atmospheric pressure and the predetermined pressure is established by increasing the volume of the system.

References Cited

UNITED STATES PATENTS 3,113,448  12/1963  Hardway et al. ____ 73—149 XR
3,241,361  3/1966  Broughton _____ 73—149

LOUIS R. PRINCE, *Primary Examiner.*

JEFFREY NOLTON, *Assistant Examiner.*